(12) United States Patent
Higuma et al.

(10) Patent No.: US 11,390,216 B2
(45) Date of Patent: Jul. 19, 2022

(54) ELECTRONIC MIRROR SYSTEM FOR A VEHICLE

(71) Applicant: TOYOTA JIDOSHA KABUSHIKI KAISHA, Toyota (JP)

(72) Inventors: Tomohito Higuma, Toyota (JP); Yosuke Kubota, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/901,061

(22) Filed: Jun. 15, 2020

(65) Prior Publication Data

US 2021/0023993 A1    Jan. 28, 2021

(30) Foreign Application Priority Data

Jul. 26, 2019 (JP) .............................. JP2019-138260

(51) Int. Cl.
| | |
|---|---|
| *B60R 1/00* | (2022.01) |
| *B60R 1/12* | (2006.01) |
| *H04N 7/18* | (2006.01) |
| *H04N 5/445* | (2011.01) |
| *H04N 5/262* | (2006.01) |
| *G06V 20/56* | (2022.01) |

(52) U.S. Cl.
CPC ................. *B60R 1/00* (2013.01); *B60R 1/12* (2013.01); *G06V 20/56* (2022.01); *H04N 5/2624* (2013.01); *H04N 5/44504* (2013.01); *H04N 7/181* (2013.01); *B60R 2001/1215* (2013.01); *B60R 2300/105* (2013.01); *B60R 2300/207* (2013.01); *B60R 2300/303* (2013.01); *B60R 2300/70* (2013.01); *B60R 2300/8046* (2013.01)

(58) Field of Classification Search
None
See application file for complete search history.

(56) References Cited

U.S. PATENT DOCUMENTS

| | | | |
|---|---|---|---|
| 2008/0231703 | A1 | 9/2008 | Nagata et al. |
| 2009/0079553 | A1 | 3/2009 | Yanagi et al. |
| | | (Continued) | |

FOREIGN PATENT DOCUMENTS

| | | |
|---|---|---|
| DE | 102016221791 A1 | 5/2018 |
| DE | 102018101592 A1 | 8/2018 |
| | (Continued) | |

*Primary Examiner* — Heather R Jones
(74) *Attorney, Agent, or Firm* — Sughrue Mion, PLLC

(57) ABSTRACT

An electronic mirror system for a vehicle includes a rear imaging device, a left and right pair of side-rear imaging devices, a display device, an anomaly treatment device, memory, and a processor coupled to the memory. The processor causes a composite image in which a rear image and side-rear images are composited to be displayed, and detects an anomaly occurring at any one of the imaging devices. In a case in which an anomaly is detected, the processor generates a substitute image based on a captured image captured by another of the imaging devices, and causes the substitute image to be displayed. And, in a case in which the one of the imaging devices at which the anomaly is detected, is restored to the normal state by the anomaly treatment device, the processor causes the composite image to be displayed instead of the substitute image.

12 Claims, 8 Drawing Sheets

(56) References Cited

U.S. PATENT DOCUMENTS

| | | | |
|---|---|---|---|
| 2016/0165148 A1* | 6/2016 | Itoh | H04N 5/247 |
| | | | 348/148 |
| 2017/0166129 A1* | 6/2017 | Kim | G06K 9/00791 |
| 2018/0220081 A1 | 8/2018 | Lewis et al. | |
| 2019/0080185 A1 | 3/2019 | Fursich | |
| 2019/0135181 A1* | 5/2019 | King | B60R 1/02 |
| 2019/0149813 A1* | 5/2019 | Sun | G03B 43/00 |
| | | | 348/187 |
| 2019/0191081 A1 | 6/2019 | Shidochi et al. | |

FOREIGN PATENT DOCUMENTS

| | | |
|---|---|---|
| JP | 2008-230558 A | 10/2008 |
| JP | 2009-081666 A | 4/2009 |
| JP | 2015-019271 A | 1/2015 |
| JP | 2017-184159 A | 10/2017 |
| JP | 2019-110492 A | 7/2019 |

\* cited by examiner

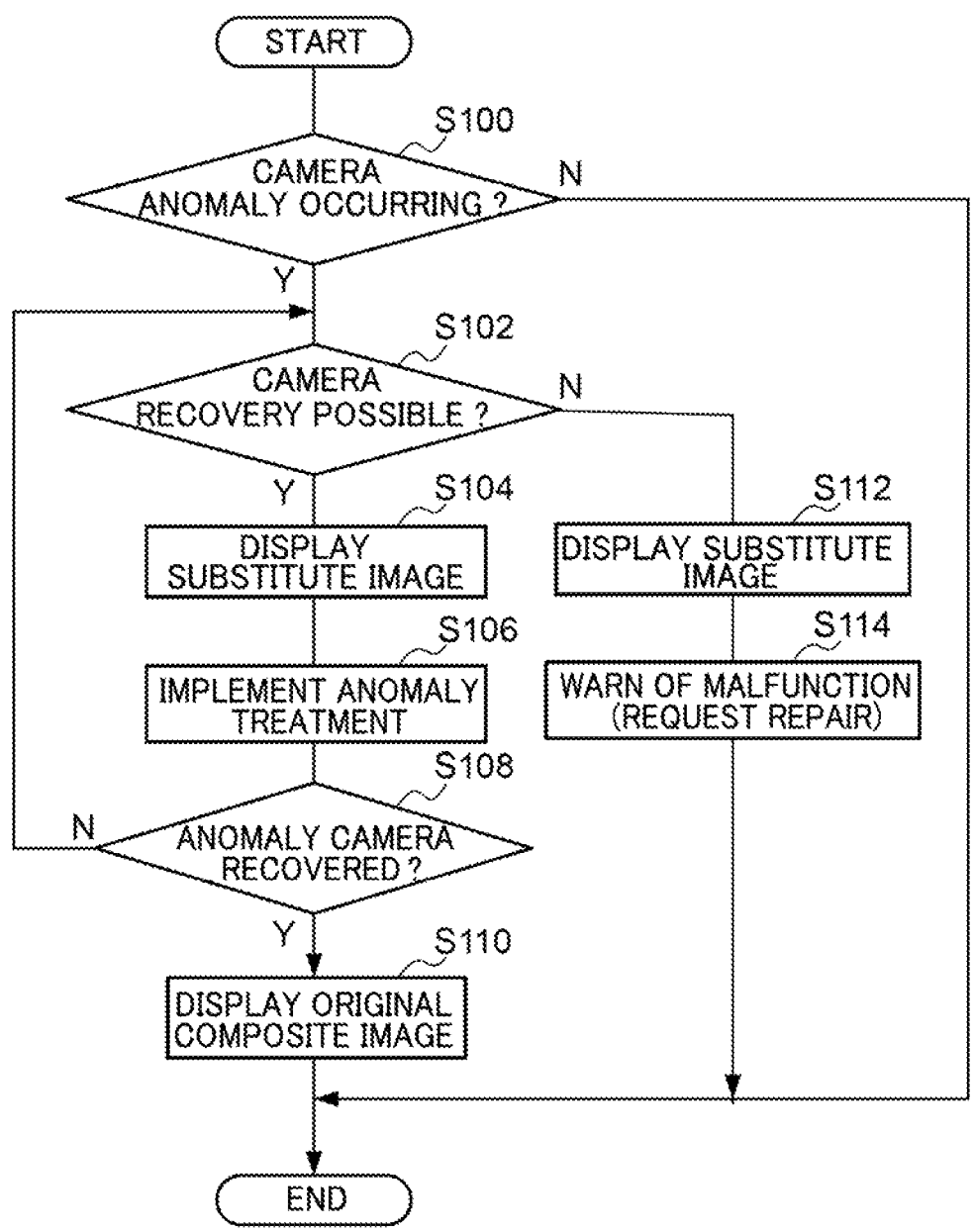

ELECTRONIC MIRROR SYSTEM FOR A VEHICLE

CROSS-REFERENCE TO RELATED APPLICATION

This application claims priority under 35 USC 119 from Japanese Patent Application No. 2019-138260 filed Jul. 26, 2019, the disclosure of which is incorporated by reference herein in its entirety.

BACKGROUND

Technical Field

The present disclosure relates to an electronic mirror system for a vehicle.

Related Art

Japanese Patent Application Laid-Open (JP-A) No. 2008-230558 discloses an invention relating to a vehicle surroundings monitoring device. In the vehicle surroundings monitoring device, an on-board camera is an imaging unit that captures surroundings of the vehicle, a mirror-integrated unit is a display unit provided in a vehicle cabin, and an image from the on-board camera is displayed at the mirror-integrated unit. Accordingly, a captured image that supplements mirror blind spots and the like may be displayed and a driver may perceive conditions in the surroundings of the vehicle in detail.

SUMMARY

However, with the structure disclosed in JP-A No. 2008-230558, in a situation in which mist, dirt or the like adheres to the on-board camera and an image may not be accurately captured, it may not be possible to display an appropriate image at the display unit and a driver may be unnecessarily distracted. If this situation continues, the driver may not be able to appropriately perceive conditions in the surroundings of the vehicle. Thus, there is scope for improvement of the conventional technology described above in this respect.

In consideration of the circumstances described above, the present disclosure provides an electronic mirror system for a vehicle that may not unnecessarily distract a driver and may allow the driver to appropriately perceive conditions in the surroundings of the vehicle.

An electronic mirror system for a vehicle according to a first aspect of the present disclosure includes: a rear imaging device that captures images rearward of the vehicle; a left and right pair of side-rear imaging devices that capture images rearward at the left and right sides of the vehicle, respectively; a display device; an anomaly treatment device that restores any one of the rear imaging device, the left side-rear imaging device or the right side-rear imaging devices, at which an anomaly is detected to a normal state; memory; and a processor that is coupled to the memory.

The processor is configured to: apply image processing to a rear image captured by the rear imaging device and side-rear images captured by the side-rear imaging devices, and cause a composite image in which the rear image and the side-rear images are composited to be displayed at the display device; detect an anomaly occurring at any one of the rear imaging device, the left side-rear imaging device, or the right side-rear imaging device; in a case in which an anomaly is detected at one of the rear imaging device, the left side-rear imaging device, or the right side-rear imaging device, generate a substitute image based on a captured image that is captured by another of the rear imaging device, the left side-rear imaging device, or the right side-rear imaging device, at which no anomaly is detected, and cause the substitute image to be displayed at the display device instead of the composite image; and in a case in which the one of the rear imaging device, the left rear-side imaging device, or the right side-rear imaging devices, at which the anomaly is detected, is restored to the normal state by the anomaly treatment device, cause the composite image to be displayed at the display device instead of the substitute image.

According to the first aspect, the electronic mirror system for a vehicle includes the rear imaging device, the side-rear imaging devices, the display device, the anomaly treatment device, the memory, and the processor connected to the memory. The rear imaging device captures to the rear of the vehicle, and the left and right pair of side-rear imaging devices capture to the rear at the left and right sides of the vehicle, respectively. The processor detects an anomaly occurring at any one of the rear imaging device, the left side-rear imaging device, or the right side-rear imaging device. The anomaly treatment device restores the one of the rear imaging device, the left side-rear imaging device, or the right side-rear imaging device, at which the anomaly has been detected to the normal state thereof. The processor causes a composite image to be displayed at the display device. The composite image is an image in which image processing is applied to the rear image captured by the rear imaging device and the side-rear images captured by the left and right pair of side-rear imaging devices and the rear image and side-rear images are composited.

When an anomaly is detected at one of the rear imaging device, the left side-rear imaging device, or the right side-rear imaging device, the processor generates a substitute image based on captured images captured by the others of the rear imaging device, the left side-rear imaging device, or the right side-rear imaging device, at which no anomaly is detected, and the processor causes the substitute image to be displayed at the display device instead of the composite image. When the one of the rear imaging device, the left side-rear imaging device, or the right side-rear imaging device, at which the anomaly was detected has been restored to the normal state thereof, the processor causes the composite image to be displayed at the display device instead of the substitute image. That is, when an anomaly is detected at one of the rear imaging device, the left side-rear imaging device, or the right side-rear imaging device, a substitute image is displayed at the display device. Therefore, a captured image captured by the one of the rear imaging device, the left side-rear imaging device, or the right side-rear imaging device, at which the anomaly has occurred is not displayed at the display device. Consequently, unnecessary distraction of a driver as a result of an irregular captured image being displayed may be suppressed. When the substitute image has been displayed, the composite image is displayed at the display device again when the one of the rear imaging device, the left side-rear imaging device, or the right side-rear imaging device has been restored to the normal state thereof by the anomaly treatment device. Therefore, the driver may appropriately perceive conditions in the surroundings of the vehicle and any impression of strangeness for the driver is minimized.

In an electronic mirror system for a vehicle according to a second aspect of the present disclosure, in the first aspect: the left and right pair of side-rear imaging devices include a common imaging range in which portions of respective imaging ranges of the left and right pair of side-rear imaging devices overlap with one another; and, in a case in which an anomaly at the rear imaging device is detected by the anomaly detection device, the processor generates the substitute image by arranging the respective side-rear images captured by the left and right pair of side-rear imaging devices at left and right with reference to the common imaging range and compositing the side-rear images.

According to the second aspect, in a case in which an anomaly is detected at the rear imaging device by an anomaly detection device, the processor causes the respective images captured by the pair of left and right side-rear imaging devices to be displayed at the display device as the substitute image. Portions of the imaging ranges of the pair of left and right side-rear imaging devices include the common imaging range in which the respective imaging ranges overlap with one another. The processor generates the substitute image by arranging and compositing the images captured by the side-rear imaging devices to left and right with reference to the common imaging range. In this substitute image, the respective images are joined together continuously with the common imaging range serving as a boundary. Therefore, even when an anomaly occurs at the rear imaging device, a wide field of view with little impression of strangeness may be provided. Moreover, because an image captured by the rear imaging device at which the anomaly has occurred is not displayed, unnecessary distraction of a driver as a result of an irregular captured image being displayed may be suppressed.

In an electronic mirror system for a vehicle according to a third aspect of the present disclosure, in the first aspect or the second aspect, in a case in which an anomaly at the side-rear imaging devices is detected, the processor generates the substitute image by applying image processing such that only the rear image captured by the rear imaging device is displayed at the display device.

According to the third aspect, when an anomaly is detected at one of the side-rear imaging devices, the processor causes only the rear image captured by the rear imaging device to be displayed as the substitute image. Therefore, an image captured by the side-rear imaging device at which the anomaly has occurred is not displayed. Consequently, unnecessary distraction of a driver as a result of an irregular captured image being displayed may be suppressed.

In an electronic mirror system for a vehicle according to a fourth aspect of the present disclosure, in any one of the first to third aspects, the processor causes at least one of a switch from the composite image to the substitute image or a switch from the substitute image to the composite image to be displayed such that images are switched gradually.

According to the fourth aspect, at one or both of times of switching from the composite image to the substitute image and switching from the substitute image to the composite image, the processor causes the display to switch the image gradually. Thus, the driver may visually follow degrees of change in the image. Therefore, the driver is more likely to be aware of changes in the image than in a situation in which the image is suddenly switched. As a result, the driver may intuitively perceive conditions even while the image is being switched.

In an electronic mirror system for a vehicle according to a fifth aspect of the present disclosure, in any one of the first to fourth aspects, the processor causes a substitute image notification display to be displayed at the display device during display of the substitute image at the display device, the substitute image notification display indicating that the substitute image is being displayed.

According to the fifth aspect, the processor causes the substitute image notification display to be displayed during display of the substitute image at the display device. Thus, the driver may be aware that a substitute image is being displayed. As a result, misunderstandings and any impression of strangeness for the driver may be reduced.

The electronic mirror system for a vehicle according to the first aspect has excellent effects of not unnecessarily distracting a driver and enabling the driver to appropriately perceive conditions in the surroundings of the vehicle.

The electronic mirror system for a vehicle according to the second aspect has an excellent effect of enabling the driver to more appropriately perceive conditions in the surroundings of the vehicle even when there is an anomaly at an imaging device.

The electronic mirror system for a vehicle according to the third aspect has an excellent effect in that an image may be displayed at the display device with little impression of strangeness even when there is an anomaly at an imaging device.

The electronic mirror system for a vehicle according to the fourth aspect has an excellent effect in that an impression of strangeness when switching image may be moderated.

The electronic mirror system for a vehicle according to the fifth aspect has an excellent effect of facilitating driver perception of conditions.

BRIEF DESCRIPTION OF THE DRAWINGS

Preferred embodiments will be described in detail based on the following figures, wherein:

FIG. 9 is a flowchart showing a flow of operation of the electronic mirror system for a vehicle according to the exemplary embodiment.

DETAILED DESCRIPTION

Below, an exemplary embodiment of an electronic mirror system for a vehicle 10 according to the present disclosure is described using FIG. 1 to FIG. 9.

Overall Structure

Figure 1:
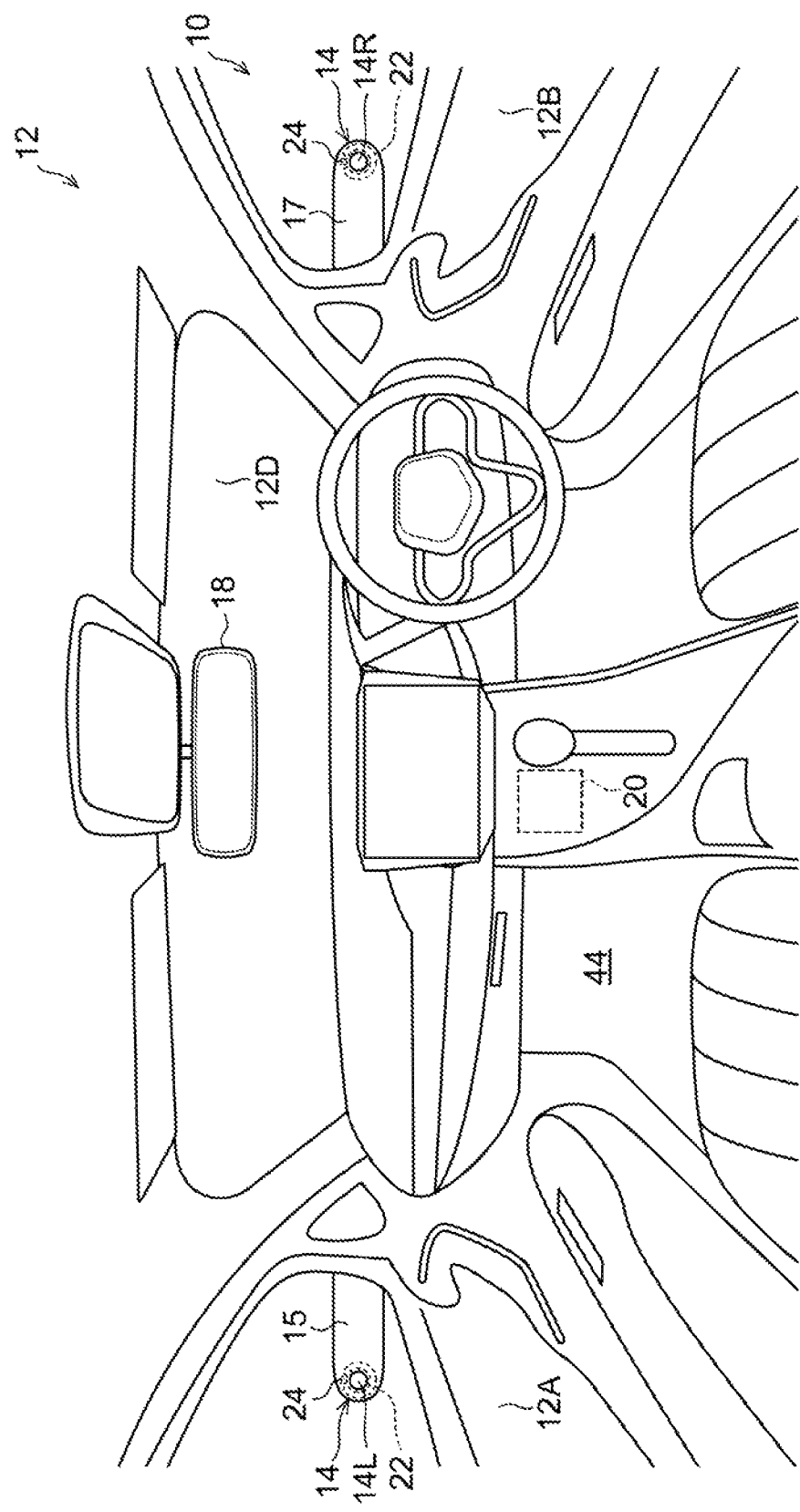
FIG. 1 is a schematic perspective view, in a state viewed toward a vehicle front side, showing a cabin interior of the vehicle, including an electronic mirror system for a vehicle according to an exemplary embodiment.

As shown in FIG. 1, the electronic mirror system for a vehicle 10 includes outer camera units 14, a rear camera 16 (see FIG. 2), an electronic inner mirror 18, a display control device 20, camera heaters 22 and camera washing devices 24. The outer camera units 14 serve as side-rear imaging devices that are mounted at a vehicle 12. The rear camera 16 serves as a rear imaging device. The electronic inner mirror 18 serves as a display device. The display control device 20 serves as an anomaly detection device and as an image processing control device. The camera heaters 22 and camera washing devices 24 serve as an anomaly treatment device.

A base portion of a camera support body 15 is attached to a vehicle front side end portion at a vehicle vertical direction middle portion of a left side door 12A (a front side door) of the vehicle 12. The camera support body 15 has a substantially cuboid shape of which a distal end portion is formed in a circular arc shape, the distal end portion protruding to the vehicle outer side. A left-rear side camera 14L constituting a portion of the outer camera units 14 is mounted at a distal end vicinity of the camera support body 15. An imaging optical axis (lens) of the left-rear side camera 14L is oriented to the left-rear side of the vehicle; the left-rear side camera 14L captures areas at the left-rear side and a left side of the vehicle. The camera support body 15 is turnable in the vehicle front-and-rear direction about an axis whose axial direction is substantially in the vehicle vertical direction. The camera support body 15 is turnable by driving force of an actuator, which is not shown in the drawings, between a stowed position, in which a length direction of the camera support body 15 is arranged along an outer side face of the vehicle, and a return position, in which the left-rear side camera 14L captures an area at the left-rear of the vehicle. Specific structures and operations of the left-rear side camera 14L are described below.

A base portion of a camera support body 17 is attached to a vehicle front side end portion of a vehicle vertical direction middle portion of a right side door 12B (a front side door) of the vehicle 12. The shape of the camera support body 17 has left-and-right symmetry with the camera support body 15. A right-rear side camera 14R constituting a portion of the outer camera unit 14 is mounted at a distal end vicinity of the camera support body 17. An imaging optical axis (lens) of the right-rear side camera 14R is oriented to the right-rear side of the vehicle; the right-rear side camera 14R captures areas at the right-rear side and a right side of the vehicle. The camera support body 17 is turnable in the vehicle front-and-rear direction about an axis whose axial direction is substantially in the vehicle vertical direction. The camera support body 17 is turnable by driving force of an actuator, which is not shown in the drawings, between a stowed position, in which a length direction of the camera support body 17 is arranged along an outer side face of the vehicle, and a return position, in which the right-rear side camera 14R captures an area at the right-rear of the vehicle. Specific structures and operations of the right-rear side camera 14R are described below.

Figure 2:
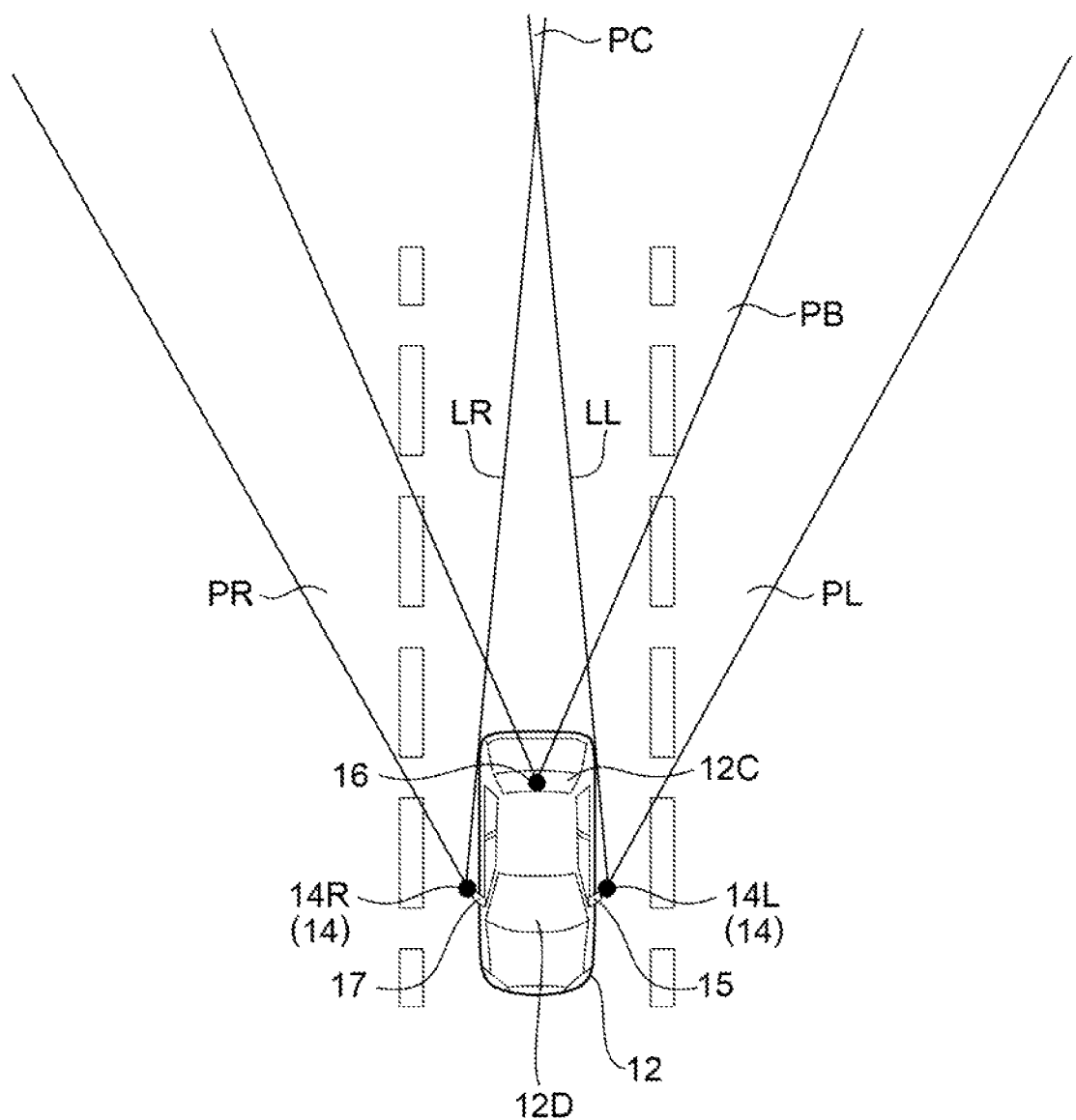
FIG. 2 is a plan view schematically showing imaging ranges in a normal state of the vehicle including the electronic mirror system for a vehicle according to the exemplary embodiment.

As shown in FIG. 2, the rear camera 16 is mounted at a vicinity of a rear windshield glass 12C inside a cabin 44 of the vehicle 12. An imaging optical axis (lens) of the rear camera 16 is oriented to the rear of the vehicle; the rear camera 16 captures an area at the rear of the vehicle 12 through the rear windshield glass 12C. Specific structures and operations of the rear camera 16 are described below.

As shown in FIG. 1, the electronic inner mirror 18 is provided substantially in the middle in the vehicle width direction at the vehicle upper side of a front windshield glass 12D. Specific structures and operations of the electronic inner mirror 18 are described below.

The camera heaters 22 and camera washing devices 24 are provided as respective left and right pairs in vicinities of the left-rear side camera 14L and right-rear side camera 14R at the camera support bodies 15 and 17. Specific structures and operations of the camera heaters 22 and camera washing devices 24 are described below.

The display control device 20 is mounted in the cabin and is connected to be capable of communications with the outer camera units 14, the rear camera 16, the electronic inner mirror 18, the camera heater 22 and the camera washing device 24. Specific structures and operations of the display control device 20 are described below.

Hardware Structures

Figure 7:
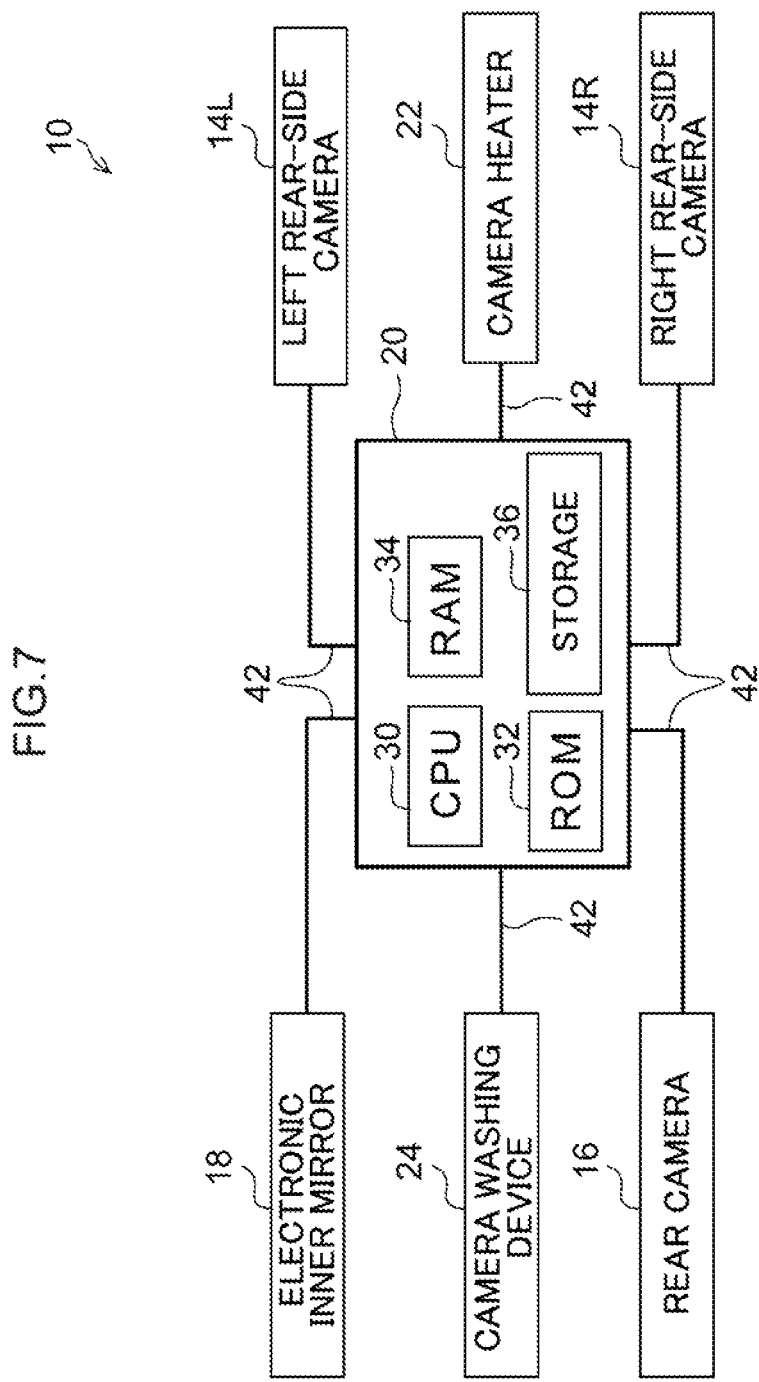
FIG. 7 is a block diagram showing hardware structures of the electronic mirror system for a vehicle according to the exemplary embodiment.

FIG. 7 is a block diagram showing hardware structures of the electronic mirror system for a vehicle 10.

As shown in FIG. 7, structures of the electronic mirror system for a vehicle 10 include a central processing unit (CPU) 30, read-only memory (ROM) 32, random access memory (RAM) 34 and storage 36, which are provided in the display control device 20, and include the left-rear side camera 14L, the right-rear side camera 14R, the rear camera 16, the electronic inner mirror 18, the camera heater 22 and the camera washing device 24. These structures are connected to be capable of communication with one another via a bus 42.

The CPU 30 is a central arithmetic processing unit, which executes various programs and controls various devices. The CPU 30 reads a program from the ROM 32 or the storage 36, and executes the program using the RAM 34 as a workspace. The CPU 30 implements control of the structures described above and various kinds of computational processing in accordance with the program recorded in the ROM 32 or storage 36. In the present exemplary embodiment, an image display program for displaying images at the electronic inner mirror 18 is stored in the ROM 32 or the storage 36.

The ROM 32 stores various programs and various kinds of data. The RAM 34 serves as a workspace, temporarily memorizing programs and data. The storage 36 is constituted by a hard disk drive (HDD) or solid-state drive (SSD) and stores various kinds of programs, including an operating system, and various kinds of data.

The left-rear side camera 14L is formed, for example, not with a structure in which the orientation of the imaging optical axis changes but with a lens with fixed focus and a relatively wide-angle field of view. Therefore, in a state in which the camera support body 15 is disposed at the return position, as shown in FIG. 2, the left-rear side camera 14L captures a constant imaging range PL with a relatively wide angle at the rear-left side of the vehicle 12. More specifically, a shape of the imaging range PL of the left-rear side camera 14L in a vehicle plan view widens in the vehicle width direction toward the vehicle rear side from a point at the vehicle width direction outer side of the camera support body 15 at which the left-rear side camera 14L is mounted. In the plan view, a boundary line LL at the vehicle width direction inner side of the imaging range PL projects tangentially to a side portion of a rear end portion of the vehicle 12 from the vehicle width direction outer side of the camera support body 15. Thus, the boundary line LL is angled to be oriented toward the vehicle width direction inner side toward the vehicle rear side in the plan view.

Similarly to the left-rear side camera 14L, the right-rear side camera 14R is formed, for example, not with a structure in which the orientation of the imaging optical axis changes but with a lens with fixed focus and a relatively wide-angle field of view. Therefore, in a state in which the camera support body 17 is disposed at the return position, the right-rear side camera 14R captures a constant imaging range PR with a relatively wide angle at the right-rear side of the vehicle 12. More specifically, a shape of the imaging range PR of the right-rear side camera 14R in the vehicle plan view widens in the vehicle width direction toward the vehicle rear side from a point at the vehicle width direction outer side of the camera support body 17 at which the right-rear side camera 14R is mounted. In the plan view, a boundary line LR at the vehicle width direction inner side of the imaging range PR projects tangentially to a side portion of a rear end portion of the vehicle 12 from the vehicle width direction outer side of the camera support body 17. Thus, the boundary line LR is angled to be oriented toward the vehicle width direction inner side toward the vehicle rear side in the plan view. Consequently, a common imaging range PC in which portions of the imaging range PR of the right-rear side camera 14R and the imaging range PL of the left-rear side camera 14L overlap with one another is formed at the rear side of the vehicle 12.

The rear camera 16 is formed, for example, not with a structure in which the orientation of the imaging optical axis changes but with a lens with fixed focus and a relatively wide-angle field of view. Therefore, the rear camera 16 captures a constant imaging range PB with a relatively wide angle at the rear side of the vehicle 12. More specifically, a shape of the imaging range PB in the vehicle plan view widens in the vehicle width direction toward the vehicle rear side from a point at the vehicle upper side and at the middle in the vehicle width direction of the rear windshield glass 12C.

As shown in FIG. 1, the electronic inner mirror 18 is structured with, for example, a liquid crystal display panel and is capable of displaying images toward the inside of the cabin 44. Images in which images captured by the rear camera 16 (see FIG. 2), the left-rear side camera 14L and the right-rear side camera 14R are subjected to image processing and composited by the display control device 20 are displayed at the electronic inner mirror 18. That is, the electronic inner mirror 18 functions as a substitute for an inner mirror. By observing images displayed at the electronic inner mirror 18, a vehicle occupant may check conditions in the surroundings of the vehicle 12, particularly to the rear of the vehicle.

The camera heaters 22 include electrical heating wires provided at outer peripheries of the lenses of the left-rear side camera 14L, the right-rear side camera 14R and the rear camera 16 (the camera heater 22 at the rear camera 16 is not shown in the drawings). During operation of each camera heater 22, heat generated by the electrical heating wire is transmitted to the lens, which may eliminate misting that occurs at the lens.

The camera washing devices 24 are provided in vicinities of the left-rear side camera 14L, the right-rear side camera 14R and the rear camera 16 (the camera washing device 24 at the rear camera 16 is not shown in the drawings). During operation of each camera washing device 24, the camera washing device 24 jets out washer fluid toward the lens, which may remove dirt and the like that has adhered to the lens.

Functional Structures

When the above-mentioned image display program is being executed, the electronic mirror system for a vehicle 10 uses the hardware resources described above to realize various functions. Functional structures realized by the electronic mirror system for a vehicle 10 are now described.

Figure 8:
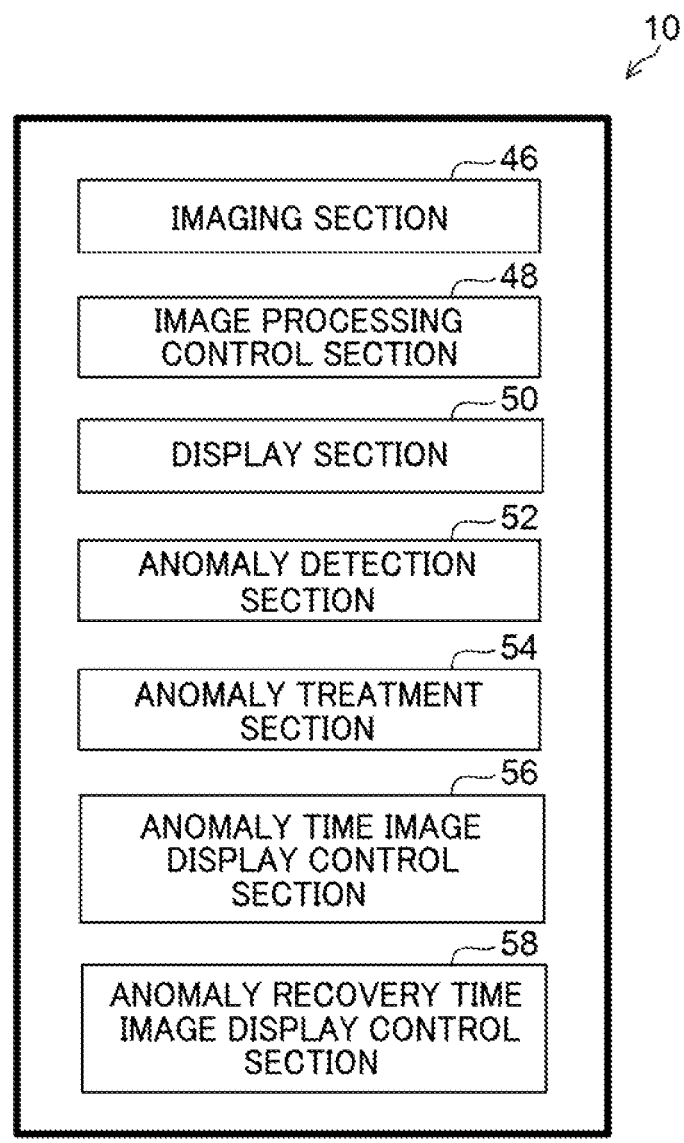
FIG. 8 is a block diagram showing functional structures of the electronic mirror system for a vehicle according to the exemplary embodiment.

FIG. 8 is a block diagram showing an example of functional structures of the electronic mirror system for a vehicle 10.

As shown in FIG. 8, as functional structures the electronic mirror system for a vehicle 10 includes an imaging section 46, an image processing control section 48, a display section 50, an anomaly detection section 52, an anomaly treatment section 54, an anomaly time image display control section 56, and an anomaly recovery time image display control section 58. These functional structures are realized by the CPU 30 of the display control device 20 reading and executing the image display program memorized in the ROM 32 or storage 36 (see FIG. 7).

The imaging section 46 captures portions of the surroundings of the vehicle 12 as moving images with the outer camera units 14 and the rear camera 16, and outputs the captured images to the image processing control section 48.

The image processing control section 48 applies image processing to the images captured by the imaging section 46 and outputs an image to the display section 50. The image processing control section 48 generates a composite image by applying image processing to composite a captured image VB from the left-rear side camera 14L and a captured image VC from the right-rear side camera 14R at each of the left and right sides of a captured image VA from the rear camera 16. Then, the image processing control section 48 causes the electronic inner mirror 18 to display the composite image (see FIG. 4).

The anomaly detection section 52 detects anomalies that occur at the outer camera units 14 and the rear camera 16. More specifically, the anomaly detection section 52 monitors images captured by the outer camera units 14 and the rear camera 16 and makes determinations as to whether the images are normal images. These determinations are based on, for example, non-output of an image due to malfunctioning of a camera, comparisons of brightness in a plural number of captured images, the orientation of a camera in association with opening and closing of a front side door, and so forth. Accordingly, the anomaly detection section 52 makes determinations about malfunctioning of the cameras, misting or adherence of dirt or the like to the lenses of the cameras, conditions in which the cameras are not imaging from the normal positions thereof and so forth; the anomaly detection section 52 determines that there is an anomaly when any of these states arises. From the determined details of an anomaly, the anomaly detection section 52 also makes a determination as to whether it is possible to recover from the anomaly. For example, the anomaly detection section 52 determines that recovery is possible when the anomaly is misting or adherence of dirt or the like to the lens of a camera or the anomaly is the camera not imaging from the normal position. In contrast, the anomaly detection section 52 determines that recovery is not possible when the anomaly is caused by a malfunction of the camera.

Further, the anomaly detection section 52 detects that an anomaly occurring at one of the outer camera units 14 and the rear camera 16 has been resolved when the one of the outer camera units 14 and rear camera 16 has been restored to the normal state thereof by the anomaly treatment section 54, closing of the front side door or the like.

When the anomaly treatment section 54 acquires from the anomaly detection section 52 information that an anomaly has occurred at one of the outer camera units 14 and the rear camera 16 and information that the anomaly is recoverable, the anomaly treatment section 54 causes the one of the outer camera units 14 and rear camera 16 at which the anomaly has occurred to be restored to the normal state thereof. That is, when an anomaly at one of the outer camera units 14 and the rear camera 16 is detected by the anomaly detection section 52 as being caused by misting of the lens, the anomaly treatment section 54 activates the camera heater 22 at the one of the outer camera units 14 and rear camera 16 at which the anomaly has occurred, eliminating the misting and restoring the one of the outer camera units 14 and rear camera 16 to the normal state. Alternatively, when an anomaly at one of the outer camera units 14 and rear camera 16 is detected as being caused by adherence of dirt or the like to the lens, the anomaly treatment section 54 activates the camera washing device 24 at the one of the outer camera units 14 and rear camera 16 at which the anomaly has occurred, removing the dirt or the like and restoring the one of the outer camera units 14 and rear camera 16 to the normal state. When an anomaly at one of the outer camera units 14 is detected by the anomaly detection section 52 as being caused by a change in orientation of the outer camera unit 14 due to opening of the corresponding front side door, the anomaly treatment section 54 causes a warning display (not shown in the drawings) to be displayed at the electronic inner mirror 18 or the like, informing a vehicle occupant that the front side door is open and encouraging the vehicle occupant to close the front side door, thus prompting the orientation of the outer camera unit 14 to be returned to the normal state thereof.

Figure 3:
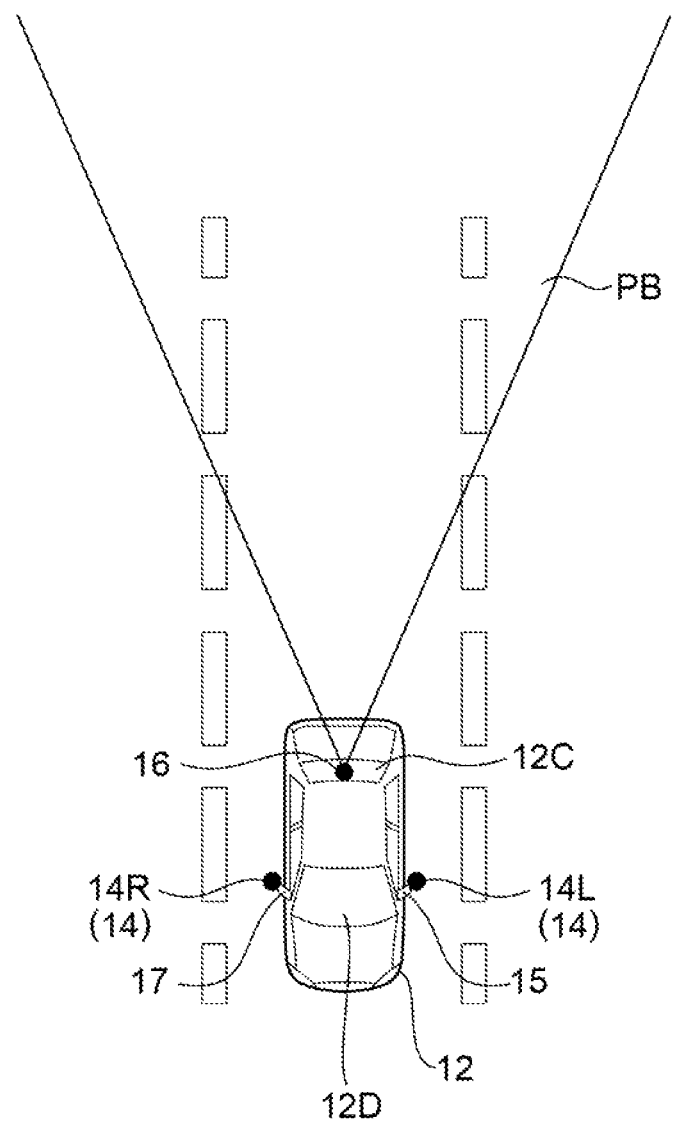
FIG. 3 is a plan view schematically showing an imaging range when an anomaly occurs at a side-rear imaging device of the vehicle including the electronic mirror system for a vehicle according to the exemplary embodiment.
Figure 4:
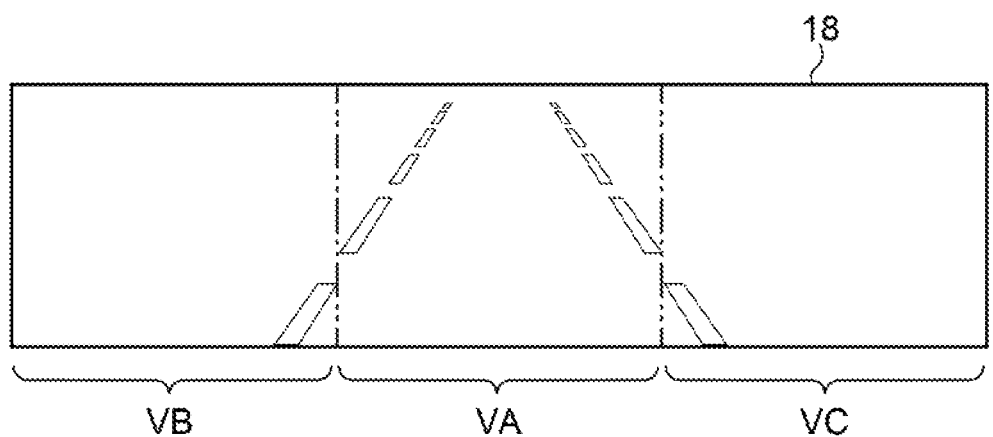
FIG. 4 is a schematic view showing a display device in the normal state of the vehicle including the electronic mirror system for a vehicle according to the exemplary embodiment.
Figure 5:
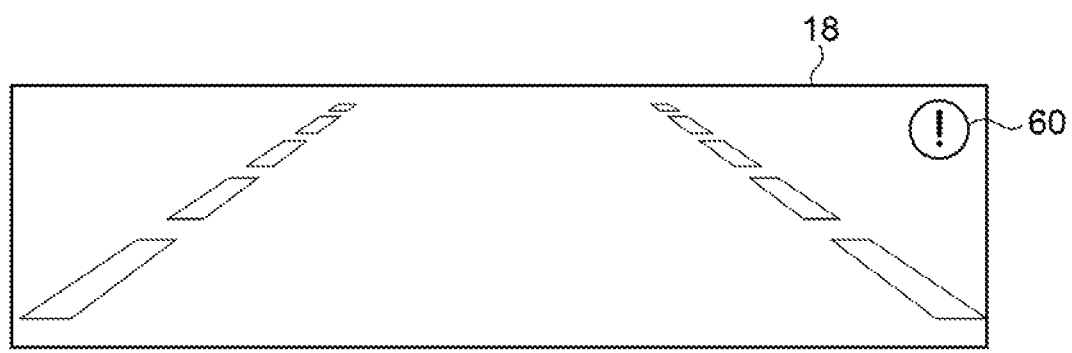
FIG. 5 is a schematic view showing a display device when an anomaly occurs at a side-rear imaging device of the vehicle including the electronic mirror system for a vehicle according to the exemplary embodiment.
Figure 6:
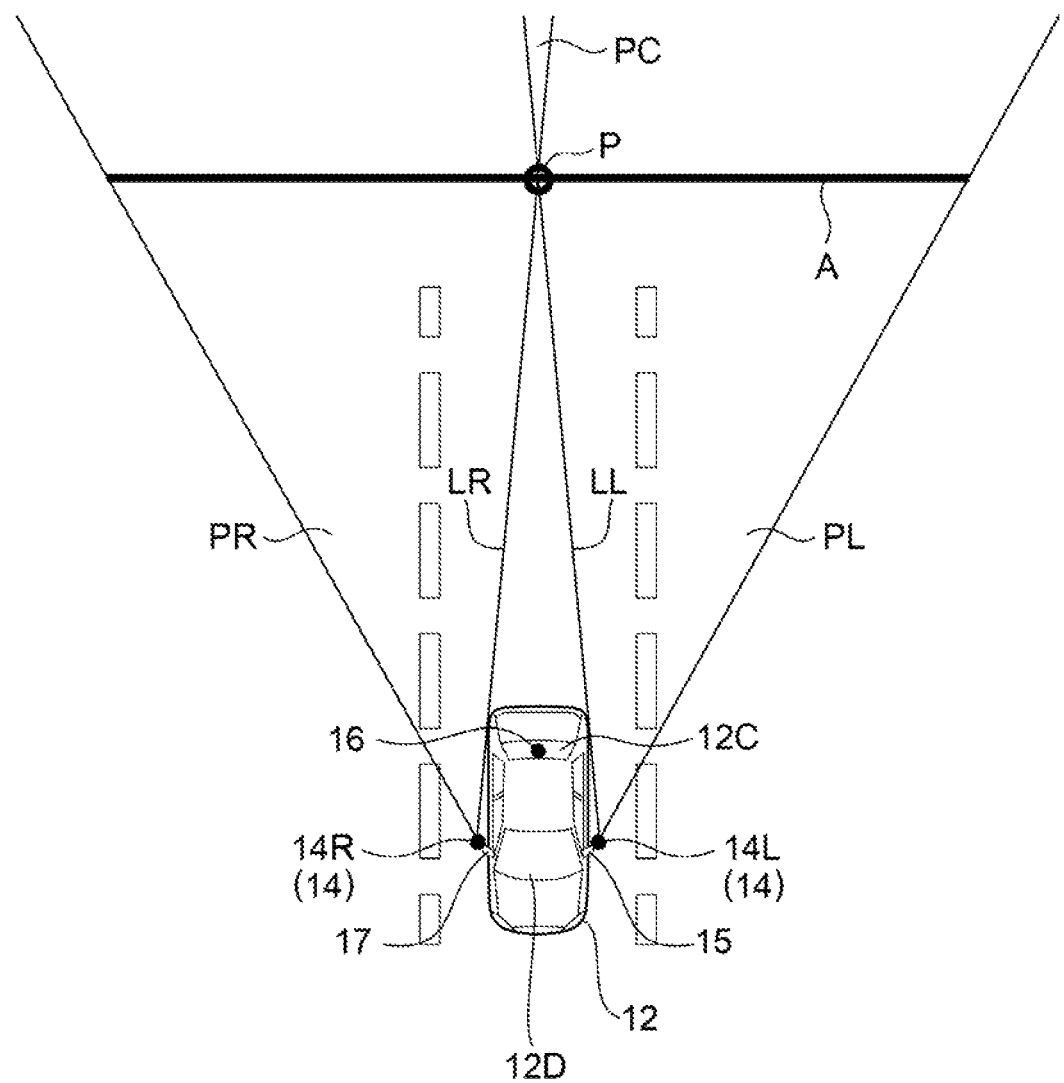
FIG. 6 is a plan view schematically showing imaging ranges when an anomaly occurs at a rear imaging device of the vehicle including the electronic mirror system for a vehicle according to the exemplary embodiment.

When an anomaly at one of the outer camera units 14 and the rear camera 16 is detected by the anomaly detection section 52, the anomaly time image display control section 56 generates a substitute image based on images captured by the others of the outer camera units 14 and the rear camera 16 at which no anomaly is detected, and the anomaly time image display control section 56 causes the substitute image to be displayed at the electronic inner mirror 18 instead of the composite image generated by the image processing control section 48. More specifically, as shown in FIG. 3, when an anomaly is detected at one or both of the left-rear side camera 14L and right-rear side camera 14R of the outer camera units 14, the anomaly time image display control section 56 generates a substitute image based on the image captured by the rear camera 16 and causes this substitute image to be displayed at the electronic inner mirror 18, as illustrated in FIG. 5. Alternatively, as illustrated in FIG. 6, when an anomaly is detected at the rear camera 16, the anomaly time image display control section 56 generates a substitute image based on the images captured by the outer camera units 14 and causes this substitute image (not shown in the drawings) to be displayed at the electronic inner mirror 18. When the anomaly time image display control section 56 generates the substitute image based on the images captured by the outer camera units 14, the anomaly time image display control section 56 arranges and composites the image captured by the left-rear side camera 14L and the image captured by the right-rear side camera 14R to left and right, centered on an end portion P at a side that is closest to the vehicle 12 of the common imaging range PC of the left-rear side camera 14L and right-rear side camera 14R. Consequently, the substitute image, which is displayed at the electronic inner mirror 18 when there is an anomaly at the rear camera 16, is an image up to a range depicted as image display range A in the vehicle plan view. The anomaly time image display control section 56 may be specified such that, when the anomaly time image display control section 56 is causing the substitute image to be displayed instead of the composite image, the display of the electronic inner mirror 18 switches gradually over a duration of, for example, about one second.

Further, when the anomaly time image display control section 56 shown in FIG. 8 acquires the information from the anomaly detection section 52 that the anomaly occurring at the one of the outer camera units 14 and rear camera 16 is recoverable, the anomaly time image display control section 56 causes a substitute image notification display 60 (see FIG. 5) to be displayed at the electronic inner mirror 18 together with the substitute image. The substitute image notification display 60 is, for example, displayed in an end portion vicinity of the electronic inner mirror 18 so as not to impair viewability of the substitute image. The shape and coloring of the substitute image notification display 60 are specified such that a driver can easily notice the display of the substitute image notification display 60.

Alternatively, if the anomaly time image display control section 56 acquires the information from the anomaly detection section 52 that the anomaly occurring at the one of the outer camera units 14 and rear camera 16 is not recoverable, the anomaly time image display control section 56 causes a warning display (not shown in the drawings) to be displayed at the electronic inner mirror 18 together with the substitute image. This warning display indicates that the one of the outer camera units 14 and the rear camera 16 has a malfunction and suggests repair at a repair shop.

When the anomaly at the one of the outer camera units 14 and the rear camera 16 is eliminated by treatment by the anomaly treatment section 54, closing of a front side door or the like, which is to say when the anomaly at the one of the outer camera units 14 and rear camera 16 has been restored to the normal state, the anomaly recovery time image display control section 58 as shown in FIG. 8 causes the composite image generated by the image processing control section 48 to be displayed at the electronic inner mirror 18 instead of the substitute image (see FIG. 4) that has been displayed at the electronic inner mirror 18. The anomaly recovery time image display control section 58 may be specified such that, when the anomaly recovery time image display control section 58 is causing the composite image to be displayed instead of the substitute image, the display of the electronic inner mirror 18 switches gradually over a duration of, for example, about one second.

Processing Flow

Now, operation of the electronic mirror system for a vehicle 10 is described. FIG. 9 is a flowchart showing a flow of operations by the electronic mirror system for a vehicle 10. Image display is implemented by the CPU 30 reading the image display program from the ROM 32 or storage 36, loading the image display program into the RAM 34 and executing the image display program.

The CPU 30 makes a determination as to whether an anomaly has occurred at one of the outer camera units 14 and the rear camera 16 (step S100). If no anomaly has occurred at the outer camera units 14 and the rear camera 16 ("No" in step S100), the CPU 30 ends the processing according to the image display program. On the other hand, if an anomaly has occurred at one of the outer camera units 14 and rear camera 16 ("Yes" in step S100), the CPU 30 makes a determination as to whether recovery of the one of the outer camera units 14 and rear camera 16 at which the anomaly has occurred is possible (step S102). If recovery of the one of the outer camera units 14 and rear camera 16 is possible ("Yes" in step S102), the CPU 30 causes a substitute image generated on the basis of images captured by the others of the outer camera units 14 and the rear camera 16 to be displayed at the electronic inner mirror 18 (step S104). Depending on the details of the anomaly, the CPU 30 also activates one or both of the camera heater 22 and camera washing device 24 at the one of the outer camera units 14 and rear camera 16 at which the anomaly has occurred, or implements a warning display prompting closing of a front side door. Thus, the CPU 30 causes the one of the outer camera units 14 and rear camera 16 to be restored to the normal state thereof (step S106).

The CPU 30 makes a determination as to whether the one of the outer camera units 14 and rear camera 16 at which the anomaly has occurred has been recovered (step S108). If the one of the outer camera units 14 and rear camera 16 has not been recovered ("No" in step S108), the CPU 30 returns to step S102 of the processing. On the other hand, if the one of the outer camera units 14 and rear camera 16 has been recovered ("Yes" in step S108), the CPU 30 causes the composite image to be displayed at the electronic inner mirror 18 instead of the substitute image (step S110) and ends the processing according to the image display program.

Alternatively, if recovery of the one of the outer camera units 14 and rear camera 16 at which the anomaly has occurred is not possible ("No" in step S102), the CPU 30 causes the substitute image generated on the basis of images captured by the others of the outer camera units 14 and rear camera 16 to be displayed at the electronic inner mirror 18 (step S112). The CPU 30 also causes an indication that the one of the outer camera units 14 and rear camera 16 has a malfunction and that suggests repair at a repair shop to be displayed at the electronic inner mirror 18 (step S114), and ends the processing according to the image display program.

Operation and Effects

Now, operation and effects of the present exemplary embodiment are described.

In the present exemplary embodiment, as shown in FIG. 7, the electronic mirror system for a vehicle includes the rear camera 16, the outer camera units 14, the display control device 20, the camera heaters 22 and the camera washing devices 24. The rear camera 16 captures images rearward of the vehicle and the left and right pair of outer camera units 14 capture images rearward, respectively, at the left and right sides of the vehicle 12. The display control device 20 detects an anomaly that occurs at any one of the outer camera units 14 and the rear camera 16. The camera heaters 22 and camera washing devices 24 apply treatment so as to restore the one of the outer camera units 14 and rear camera 16 at which the anomaly has been detected to the normal state. The display control device 20 causes the composite image to be displayed at the electronic inner mirror 18. This composite image is an image that is composited by applying image processing to a rear image captured by the rear imaging device and side-rear images captured by the side-rear imaging devices.

The display control device 20 includes the anomaly time image display control section 56 and the anomaly recovery time image display control section 58. When an anomaly is detected at one of the outer camera units 14 and the rear camera 16, the anomaly time image display control section 56 generates a substitute image based on a captured image(s) captured by the others of the rear camera 16 and outer camera units 14 at which no anomaly is detected, and causes the substitute image to be displayed at the electronic inner mirror 18 instead of the composite image. When the one of the outer camera units 14 and rear camera 16 at which the anomaly was detected has been restored to the normal state thereof by the camera heater 22, the camera washing device 24 or closing of a front side door, the anomaly recovery time image display control section 58 causes the composite image to be displayed at the electronic inner mirror 18 instead of the substitute image. That is, when an anomaly is detected at one of the outer camera units 14 and the rear camera 16, a substitute image is displayed at the electronic inner mirror 18. Therefore, an image of a state in which an anomaly has occurred is not displayed at the electronic inner mirror 18. Consequently, unnecessary distraction of a driver as a result of an irregular captured image being displayed may be suppressed. While the substitute image is being displayed, the camera heater 22 and camera washing device 24 may be activated or restoration of the one of the outer camera units 14 and rear camera 16 to the normal state may be prompted by a warning display that encourages closing of a front side door. After the one of the outer camera units 14 and rear camera 16 has been restored to the normal state thereof, the composite image is displayed at the electronic inner mirror 18. Therefore, the driver may appropriately perceive conditions in the surroundings of the vehicle and any impression of strangeness for the driver is minimized. Thus, the driver is not unnecessarily distracted and may appropriately perceive conditions in the surroundings of the vehicle 12.

When an anomaly at the rear camera 16 is detected by the display control device 20, the anomaly time image display control section 56 causes the respective side-rear images captured by the left and right pair of outer camera units 14 to be displayed at the electronic inner mirror 18 as the substitute image. The left and right pair of outer camera units 14 include the common imaging range in which portions of the respective imaging ranges overlap. The anomaly time image display control section 56 generates the substitute image by arranging and compositing the images captured by the outer camera units 14 at left and right with reference to the common imaging range (see FIG. 6). In this substitute image, the respective images are joined together continuously with the common imaging range PC serving as a boundary. Therefore, even when an anomaly occurs at the rear camera 16, a wide field of view with little impression of strangeness may be provided. Because an image captured by the rear camera 16 at which the anomaly has occurred is not displayed, unnecessary distraction of a driver as a result of an irregular captured image being displayed may be suppressed. Thus, a driver may more appropriately perceive conditions in the surroundings of the vehicle 12 even when there is an anomaly at the rear camera 16.

When an anomaly at the outer camera units 14 is detected by the display control device 20, the anomaly time image display control section 56 causes only the rear image captured by the rear camera 16 to be displayed at the electronic inner mirror 18 as the substitute image. Therefore, an image captured by the outer camera unit 14 at which the anomaly has occurred is not displayed. Consequently, unnecessary distraction of a driver as a result of an irregular captured image being displayed may be suppressed. Thus, an image may be displayed at the electronic inner mirror 18 with little impression of strangeness even when there is an anomaly at one of the outer camera units 14.

When switching from the composite image to the substitute image and when switching from the substitute image to the composite image, the display control device 20 causes the display to switch image gradually. Thus, the driver may visually follow degrees of change in the image. Therefore, the driver is more likely to be aware of changes in the image than in a situation in which the image is suddenly switched. As a result, the driver may intuitively perceive conditions even while the image is being switched. Thus, an impression of strangeness when switching image may be moderated.

The display control device 20 causes the substitute image notification display 60 (see FIG. 5) to be displayed during display of the substitute image at the electronic inner mirror 18. Thus, the driver may be aware that a substitute image is being displayed. As a result, misunderstandings and any impression of strangeness for the driver may be reduced. Thus, driver perception of conditions is facilitated.

The present exemplary embodiment has a structure in which the camera heaters 22 and camera washing devices 24 are provided to serve as the anomaly treatment device, but this is not limiting. A structure may be provided in which a wind-blowing device that blows compressed air toward the lens of a camera is attached at the lens and eliminates dust and the like. Anomaly states of cameras may be restored to normal states by alternative structures.

When an anomaly of one of the outer camera units 14 is detected as being caused by a change in orientation of the outer camera unit 14 due to the front side door being in an open state, the anomaly treatment section 54 is configured to cause a warning display to be displayed to a vehicle occupant by the electronic inner mirror 18 or the like, informing the vehicle occupant that the front side door is open and encouraging the vehicle occupant to close the front side door, but this is not limiting. This notification may be given just by a warning sound, or the open front side door may be closed automatically. Further, when an anomaly at one of the outer camera units 14 is detected as being caused by a change in orientation of the outer camera unit 14 due to the front side door being in an open state, the anomaly time image display control section 56 generates a substitute image based on an image captured by the rear camera 16, but this is not limiting. The anomaly time image display control section 56 may generate a substitute image in which an image captured by one of the left-rear side camera 14L and right-rear side camera 14R that is mounted at a side at which the front side door is not open is composited with the image captured by the rear camera 16. When there is an anomaly at one of the outer camera units 14 due to the camera support body 15 or 17 being in the stowed position, the anomaly treatment section 54 may be configured to implement a warning display to a vehicle occupant prompting the vehicle occupant to return the camera support body 15 or 17 to the return position, and may be configured to return the camera support body 15 or 17 to the return position automatically.

The rear camera 16 is provided inside the cabin 44, but this is not limiting. The rear camera 16 may be disposed at any position from which imaging to the rear of the vehicle 12 is possible, such as a trunk lid of the vehicle 12, a rear bumper vicinity or the like. If the rear camera 16 is mounted at a trunk lid (tailgate door) or the like, then when the orientation of the rear camera 16 changes due to the trunk lid being in an open state and an anomaly is determined, the anomaly treatment section 54 may be configured to notify that the trunk lid is open and give a report by a warning display, warning sound or the like to prompt closing of the trunk lid, and the anomaly treatment section 54 may be configured to close the trunk lid automatically.

When the anomaly treatment section 54 acquires information that an anomaly has occurred at one of the outer camera units 14 and the rear camera 16 and information that recovery from this anomaly is possible, the anomaly treatment section 54 is configured to automatically restore the one of the outer camera units 14 and rear camera 16 at which the anomaly has occurred to the normal state thereof, but this is not limiting. The anomaly treatment section 54 may be configured to restore the one of the outer camera units 14 and rear camera 16 to the normal state in accordance with operation by a vehicle occupant, and may be configured to activate only a particular anomaly treatment device such as the camera washing device 24 or the like in accordance with operation by a vehicle occupant.

The electronic inner mirror 18 serves as the display device, but this is not limiting. An alternative screen device such as a display screen of a car navigation system or the like may serve as the display device.

Switching between a composite image and a substitute image is implemented gradually, but this is not limiting. Switching may be implemented gradually for only one or the other of the switching times, and switching may be implemented instantaneously rather than gradually.

The substitute image notification display 60 (see FIG. 5) is displayed when a substitute image is being displayed at the electronic inner mirror 18, but this is not limiting. The substitute image notification display 60 need not be displayed.

When an anomaly occurs at one of the outer camera units 14 and the rear camera 16, an image captured by the others of the outer camera units 14 and the rear camera 16 is displayed as the substitute image, but this is not limiting. The substitute image may be generated using an image captured by an alternative imaging device, such as a back camera not shown in the drawings that is used during reversing of the vehicle 12 and is provided separately from the rear camera 16, a vehicle surroundings monitoring camera not shown in the drawings that is for monitoring conditions in the surroundings of the vehicle 12, or the like.

The outer camera units 14 are provided at respective distal end portion vicinities of the camera support bodies 15 and 17, but this is not limiting. A structure provided with an optical mirror is also possible. That is, a structure is possible in which the outer camera unit 14, the camera heater 22 and the camera washing device 24 are provided at an outer mirror housing structured by an optical mirror.

Hereabove, an exemplary embodiment of the present invention has been described. The present invention is not limited by these descriptions, and it will be clear that numerous modifications outside of these descriptions may be embodied within a technical scope not departing from the scope of the invention.

What is claimed is:

1. An electronic mirror system for a vehicle, comprising:
   a rear imaging device that captures images rearward of the vehicle;
   a left and right pair of side-rear imaging devices that capture images rearward at left and right sides of the vehicle, respectively;
   an electronic inner mirror;
   an anomaly treatment device that restores any one of the rear imaging device, the left side-rear imaging device or the right side-rear imaging device, at which an anomaly is detected, to a normal state;

memory; and a processor that is coupled to the memory, the processor being configured to:

apply image processing to a rear image captured by the rear imaging device and side-rear images captured by the side-rear imaging devices, and cause a composite image in which the rear image and the side-rear images are composited to be displayed at the electronic inner mirror;

detect an anomaly occurring at any one of the rear imaging device, the side-rear imaging device, or the right side-rear imaging device;

in a case in which an anomaly is detected at one of the rear imaging device, the left side-rear imaging device or the right side-rear imaging device, generate a substitute image based on a captured image that is captured by another of the rear imaging device, the left side-rear imaging device or the right side-rear imaging device, at which no anomaly is detected, and cause the substitute image to be displayed at the electronic inner mirror instead of the composite image; and in a case in which the one of the rear imaging device, the left side-rear imaging device or the right side-rear imaging device, at which the anomaly is detected, is restored to the normal state by the anomaly treatment device, cause the composite image to be displayed at the electronic inner mirror instead of the substitute image, wherein:

an imaging optical axis of the rear imaging device is oriented to a rear side of the vehicle, and a shape of an imaging range in a vehicle plan view of the rear imaging device widens in a vehicle width direction toward the rear side of the vehicle from a point at an upper side and at a middle in the vehicle width direction of a rear windshield glass, an imaging optical axis of the left side-rear imaging device is oriented to a left-rear side of the vehicle, and a shape of an imaging range of the left side-rear imaging device in the vehicle plan view widens in the vehicle width direction toward the rear side of the vehicle from a point at which the left-rear side imaging device is mounted, and an imaging optical axis of the right side-rear imaging device is oriented to a right-rear side of the vehicle, and a shape of an imaging range of the right side-rear imaging device in the vehicle plan view widens in the vehicle width direction toward the rear side of the vehicle from a point at which the right-rear side imaging device is mounted.

2. The electronic mirror system for a vehicle according to claim 1, wherein:

the left and right pair of side-rear imaging devices include a common imaging range in which portions of respective imaging ranges of the left and right pair of side-rear imaging devices overlap with one another; and in a case in which an anomaly at the rear imaging device is detected, the processor generates the substitute image by arranging the respective side-rear images captured by the left and right pair of side-rear imaging devices at left and right with reference to the common imaging range, and compositing the side-rear images.

3. The electronic mirror system for a vehicle according to claim 2, wherein, in a case in which an anomaly at the side-rear imaging devices is detected, the processor generates the substitute image by applying image processing such that only the rear image captured by the rear imaging device is displayed at the electronic inner mirror.

4. The electronic mirror system for a vehicle according to claim 3, wherein the processor causes at least one of a switch from the composite image to the substitute image or a switch from the substitute image to the composite image to be displayed such that images are switched gradually.

5. The electronic mirror system for a vehicle according to claim 2, wherein the processor causes at least one of a switch from the composite image to the substitute image or a switch from the substitute image to the composite image to be displayed such that images are switched gradually.

6. The electronic mirror system for a vehicle according to claim 2, wherein the processor causes a substitute image notification display to be displayed at the electronic inner mirror during display of the substitute image at the electronic inner mirror, the substitute image notification display indicating that the substitute image is being displayed.

7. The electronic mirror system for a vehicle according to claim 1, wherein, in a case in which an anomaly at the side-rear imaging devices is detected, the processor generates the substitute image by applying image processing such that only the rear image captured by the rear imaging device is displayed at the electronic inner mirror.

8. The electronic mirror system for a vehicle according to claim 7, wherein the processor causes at least one of a switch from the composite image to the substitute image or a switch from the substitute image to the composite image to be displayed such that images are switched gradually.

9. The electronic mirror system for a vehicle according to claim 7, wherein the processor causes a substitute image notification display to be displayed at the electronic inner mirror during display of the substitute image at the electronic inner mirror, the substitute image notification display indicating that the substitute image is being displayed.

10. The electronic mirror system for a vehicle according to claim 1, wherein the processor causes at least one of a switch from the composite image to the substitute image or a switch from the substitute image to the composite image to be displayed such that images are switched gradually.

11. The electronic mirror system for a vehicle according to claim 10, wherein the processor causes a substitute image notification display to be displayed at the electronic inner mirror during display of the substitute image at the electronic inner mirror, the substitute image notification display indicating that the substitute image is being displayed.

12. The electronic mirror system for a vehicle according to claim 1, wherein the processor causes a substitute image notification display to be displayed at the electronic inner mirror during display of the substitute image at the electronic inner mirror, the substitute image notification display indicating that the substitute image is being displayed.

* * * * *